United States Patent [19]

Goldmann

[11] Patent Number: 4,639,793
[45] Date of Patent: Jan. 27, 1987

[54] SYSTEM FOR RECORDING OR DETECTING TWO MARKING SIGNALS ON A RECORD CARRIER

[75] Inventor: Peter Goldmann, Vienna, Austria

[73] Assignee: U.S. Philips Corporation, New York, N.Y.

[21] Appl. No.: 850,442

[22] Filed: Apr. 9, 1986

Related U.S. Application Data

[63] Continuation of Ser. No. 539,491, Oct. 6, 1983, abandoned.

[30] Foreign Application Priority Data

Dec. 7, 1982 [AT] Austria .................................. 4450/82

[51] Int. Cl.⁴ .......................... G11B 27/28; G11B 5/09
[52] U.S. Cl. ..................................... 360/44; 360/72.2; 307/234; 340/347 DD
[58] Field of Search ....................... 360/13, 27, 39, 40, 360/48, 49, 51, 44, 74.4, 72.2, 79, 80, 18; 369/25, 27, 28; 340/347 DD; 328/110, 112, 111; 307/324, 517, 518; 375/22; 371/69

[56] References Cited

U.S. PATENT DOCUMENTS

| | | | |
|---|---|---|---|
| 2,887,674 | 5/1959 | Greene | 360/44 |
| 3,720,927 | 3/1973 | Wolf | 360/44 |
| 3,851,116 | 11/1974 | Cannon | 360/72.2 |
| 3,974,523 | 8/1976 | Miller et al. | 360/51 |
| 4,007,491 | 2/1977 | Bolick, Jr. et al. | 360/74.4 |
| 4,032,915 | 6/1977 | Shanks et al. | 360/44 |
| 4,080,637 | 3/1978 | Chase et al. | 360/80 |
| 4,184,179 | 1/1980 | Deming | 360/44 |

FOREIGN PATENT DOCUMENTS 55-52571 4/1980 Japan .................................. 360/72.2

OTHER PUBLICATIONS

EDN, vol. 23, No. 9, "Standard 3M Recording Techniques Could Spur Low-Cost $\mu$C use", Kramer, 5/5/78, pp. 75–81.

Primary Examiner—Raymond F. Cardillo
Assistant Examiner—Steven R. Garland
Attorney, Agent, or Firm—David R. Treacy

[57] ABSTRACT

In recording and/or detecting two different marking signals on or from a record carrier, a generator for marking signals comprises at least one pulse generator which supplies marking signals in the form of two marking-pulse trains M1 and M2 having the same frequency but having different duty factors with the values k and $1-k$ respectively, which differ from 0.5. A detection circuit for detecting marking signals detects the duty factor of a marking pulse train M1 or M2 respectively and which supplies a specific detection signal in conformity with its detected pulse train.

9 Claims, 9 Drawing Figures

SYSTEM FOR RECORDING OR DETECTING TWO MARKING SIGNALS ON A RECORD CARRIER

This is a continuation of application Ser. No. 539,491, filed Oct. 6, 1983, now abandoned.

BACKGROUND OF THE INVENTION

The invention relates to a system for recording and/or detecting marking signals of two different types which can be recorded on or scanned from a record carrier and which differ from each other in respect of at least one parameter, which system comprises a recording device for recording the marking signals and a detection device for detecting said signals, the recording device comprising generator means for selectively generating the marking signals to be recorded on the record carrier and the detection device comprising detector means for selectively detecting the marking signals read from the record carrier.

In a known system of this type, as for example used in a dictation machine for recording and playing back dictations which is manufactured and marketed by the N. V. Philips Gloeilampenfabrieken of the Netherlands under the type designation LFH 0303, the two marking signals are sinewave signals or different frequencies. One marking signal is a sinewave signal having a frequency of 40 Hz and the other marking signal is formed by a mixture of two sinewave signals having frequencies of 40 Hz and 1500 Hz. The marking signals identify specific locations where information signals corresponding to the dictated text are stored on the record carrier, such as for identifying the ends of dictations or information-signal locations corresponding to passages of the dictations to be corrected.

In the known system the generator means comprises two sinewave generators for generating the marking signals and the detector means comprise two amplitude detectors for detecting the marking signals. To ensure correct and reliable operation, filter circuits are required both for the generation and the detection of the sinusoidal marking signals. These filters are comparatively intricate and expensive, occupy a substantial amount of space and in addition require frequency adjustment. Moreover, in such a system in which the frequencies of the marking signals differ from each other, the spacing between the marking signal frequencies must be comparatively wide for reliable and correct detection of signals. As a result of this at least the frequency of one of the marking signals will be situated within the frequency range of the information signals which can be stored on the record carrier. Thus the information signals may be disturbed by the relevant marking signal and the information signals may adversely affect the detection of the relevant marking signal. Moreover, when marking signals of different frequencies are detected, the frequency of the marking signals scanned from the record carrier depends on the speed of transport of the record carrier relative to the scanning element by which the marking signals are scanned. A variation of this speed of transport during scanning of the marking signals or the use of a speed of transport during scanning of the marking signals which differs from that during recording, for example when the marking signals are scanned in a fast-wind mode of the record carrier, then causes the frequencies of the marking signals scanned from the record carrier to be shifted relative to the frequency selected during recording. Allowance for this shift must be made in processing the marking signals further complicates the circuitry.

SUMMARY OF THE INVENTION

It is the object of the invention to provide a system of the type mentioned in the opening paragraph which enables two marking signals, which both have frequencies outside the frequency range of the information signals, to be generated and detected in a simple manner, and without influence on the detection of these signals by the speed of transport of the record carrier relative to the scanning element by which the marking signals are scanned from this record carrier.

In accordance with the invention, the generator means comprise at least one pulse generator, which supplies marking signals in the form of two marking-pulse trains having the same frequency but having different duty factors which differ from the value 0.5, the duty factor of one marking-pulse train being k and the duty factor of the other marking pulse train being $1-k$, and the detector means comprise at least one duty-factor detector, which detects the duty factor of a marking-pulse train and which supplies a specific detection signal depending on the detected duty factor.

This results in a simple and compact circuit design, which requires no separate adjustments for correct operation because, as is known, pulse generators have a simple circuit design and because pulse signals which differ only in respect of their duty factors can be generated and detected in a simple manner. Since the two marking pulse trains have the same frequency the frequency may be suitably selected so that the frequency of the two marking signals is situated outside the frequency range of the information signals, thus keeping the marking signals and information signals from influencing and disturbing each other. The frequency spacing between the frequency of the marking-pulse trains and the frequency range of the information signals may be selected so large that even the even harmonics of the marking signals are situated outside the frequency range of the information signals and consequently have no adverse effect. Since the two marking signals differ from each other only in respect of the parameter of the duty factor of pulse trains, the special advantage is obtained that detection of the marking signals is independent of the speed of transport of the record carrier relative to the scanning element. This is a result of the fact that the duty factors of the marking-pulse trains being scanned remain the same independently of this speed of transport. Thus, if during detection of the marking signals the speed of transport varies or differs from that during recording no special steps are required for the detection; this permits use of simplified circuitry. Since one marking-pulse train has a duty factor k and the other marking-pulse train has a duty factor $1-k$, the two marking-pulse trains can be distinguished from each other in a particularly simple and reliable manner because their duty factors are mirror-inverted relative to the duty factor 0.5. This relationship is advantageous for correct detection of the marking signals.

For a correct identification of the two marking signals the difference between the duty factors of the marking-pulse trains must be as large as possible. However, for a minimal harmonic content of the two marking signals the duty factors of the marking pulse trains must be equal to each other. A satisfactory compromise between these two conflicting requirements imposed on the duty factors of the two marking-pulse trains is obtained if the duty factors k and 1−k of the respective marking-pulse trains are of the order of magnitude of, that is to say, approximately 0.25 and 0.75 respectively. This guarantees both a satisfactory identification and a minimal harmonic content of the two marking signals.

For the pulse generator several possibilities are known. For example, the pulse generator may be an astable multivibrator with a switchable duty factor, the two marking-pulse trains being taken from the same output of this multivibrator. However, it is found to be particularly advantageous if the pulse generator comprises a single astable multivibrator having a fixed duty factor and the marking-pulse trains are formed by the two output-pulse trains of opposite phase supplied by the astable multivibrator. In this way the two marking signals can be generated by a single astable multivibrator having a fixed duty factor without the provision of separate switching facilities. Moreover, since an astable multivibrator supplies two output signals which are exactly in phase opposition, the requirement that if the duty factor of one marking-pulse train is k the duty factor of the other marking-pulse train should be 1−k can be met in a particularly simple manner and independently of component tolerances and power supply variations.

Several possibilities are also known for the circuit design of the duty-factor detectors. In this respect reference is made to, for example, U.S. Pat. No. 3,735,271, which discloses a circuit arrangement for detecting pulses having different duty factors by means of time-window discriminator circuits comprising monostable multivibrator stages. However, it is found to be advantageous if the duty-factor detector comprises a scanning-pulse generator, for generating a scanning-pulse train whose frequency is at least a factor corresponding to the reciprocal of the smaller duty factor higher than the frequency of the marking-pulse trains scanned from the record carrier, a counting circuit, which counts the number $Z_i$ of scanning pulses occurring during the pulse width in at least one period of a marking-pulse train and the number $Z_p$ of scanning pulses occurring during the pulse spacing in said period, and a comparator circuit which compares the numbers $Z_i$ and $Z_p$ with each other and thereby determines the duty factor of a marking-pulse train. In this way a duty-factor detector is obtained which can be constructed very simply using digital circuit technology, which is advantageous for simple and reliable detection of the marking-pulse trains. Moreover, this duty-factor detector has the advantage that it always guarantees correct detection of the duty factors of the marking-pulse trains independently of the speed of transport of the record carrier relative to the scanning element for the marking signals during detection of these signals.

Embodiments of the invention will be described in more detail, by way of example, with reference to the drawings.

BRIEF DESCRIPTION OF THE DRAWINGS

FIG. 6 is a flow chart of a program for generating a marking-pulse train as shown in FIG. 3a by means of a microcomputer, FIG. 7 a flow chart for a program for detecting a marking-pulse train as shown in FIG. 3a by means of a microcomputer, and FIG. 8 is a flow chart, which has been elaborated in comparison with the flow chart in FIG. 7, for a program for detecting a marking-pulse train as shown in FIG. 3a by means of a micro-computer.

DESCRIPTION OF THE PREFERRED EMBODIMENTS

Figure 1:
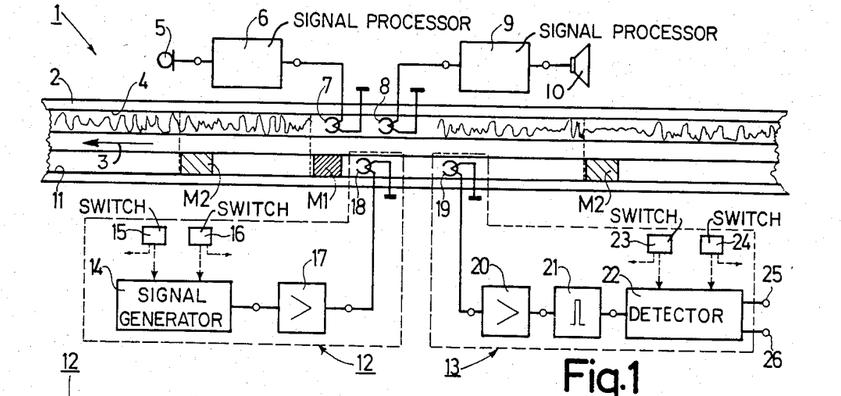
FIG. 1 is a combination diagrammatic view and schematic block diagram of a dictation recording apparatus in accordance with the invention.

FIG. 1, partly in schematic form, shows an apparatus 1 for recording and reproducing dictation signals on/- from a magnetizable record carrier 2 in the form of a tape; during recording and reproduction of the information signals corresponding to the dictation a drive mechanism of the apparatus drives said record carrier with a predetermined speed of transport in the direction indicated by an arrow 3, the information signals being recorded on said record carrier in an information track 4, as is symbolically indicated in FIG. 1. For recording the dictations a microphone 5 is connected to the apparatus 1, which microphone converts the acoustic signals into electric signals which are applied to a recording signal-processing circuit 6 which drives a magnetic recording head 7 by means of which the information signals corresponding to the dictation are recorded in the information track 4. For reproducing these information signals a magnetic playback head 8 applies the signal read from the record carrier 2 to a playback signal-processing circuit 9, which for acoustic reproduction of the recorded dictation applies the electric signals to a loudspeaker 10 which is connected to the apparatus 1 and which converts them into acoustic signals.

The record carrier 2 comprises a marking track 11 which extends parallel to the information track 4 and which serves for the storage of two marking signals M1 and M2, which differ from each other in respect of at least one parameter. The marking signals serve for identifying specific locations wherein information signals corresponding to the recorded dictations are stored in the information track 4 on the record carrier 2. In the present case the marking signal M1 serves for identifying the locations where information signals are recorded which correspond to the end of a dictation and the marking signal M2 serves for identifying information-signal locations corresponding to passages of a dictation to be corrected, as is schematically indicated by a broken line in FIG. 1. By recording such marking signals on the record carrier it is possible the information-signal passages thus identified can be located in a simple and easy manner by detecting these marking signals. If during such a process a marking signal is detected, an acoustic or optical indication signal may be generated in response thereto or the search process may be stopped automatically, the record carrier then being stopped in a position determined by the marking signal thus detected.

A recording device 12 for recording the two marking signals M1 and M2 is indicated by a dashed frame, and a detection device 13 for these signals is also indicated by a dashed frame. The recording device 12 comprises generator means in the form of a generator circuit 14, which can be actuated by means of either of two buttons 15 and 16 to start the recording process of the respective marking signal. When the button 15 is actuated the generator circuit 14 supplies the marking signal M1 and when the button 16 is actuated the circuit supplies the marking signal M2 to a magnetic recording head 18 via an amplifier circuit 17 for recording the signal in the marking track 11.

The detection device 13 comprises a magnetic playback head 19 for scanning the marking signals M1 and M2. The magnetic playback head 19 is connected to an amplifier 20, which via a signal-shaper circuit 21 is connected to detector means in the form of a detector circuit 22 for detecting the marking signals scanned from the record carrier. The detector circuit 22 can be actuated by means of either of two buttons 23 and 24 for starting the detection process of the respective marking signal, marking signal M1 being detectable when the button 23 is actuated. A specific first detection signal is produced on an output 25 upon detection of an M1 signal. Marking signal M2 is detectable when the button 24 is actuated, and a specific second detection signal is produced on an output 26 in response to such a detection.

Subsequently, these detection signals may be used in the apparatus, as already stated, for generating an acoustic or optical indication signal or for automatically stopping the marking-signal search process and for stopping the tape. In this respect it is to be noted that when the marking signals M1 and M2 are recorded on the record carrier 2 and also when the information signals are recorded the record carrier 2 is driven with the specified speed of transport in the direction indicated by the arrow 3. During detection of the marking signals M1 and M2 both the direction and the speed of transport of the record carrier may differ from those during recording. The record-carrier drive is started for the recording or detection of marking signals by actuating the buttons 15 and 16 or 23 and 24, but for simplicity this is not shown.

Figure 2:
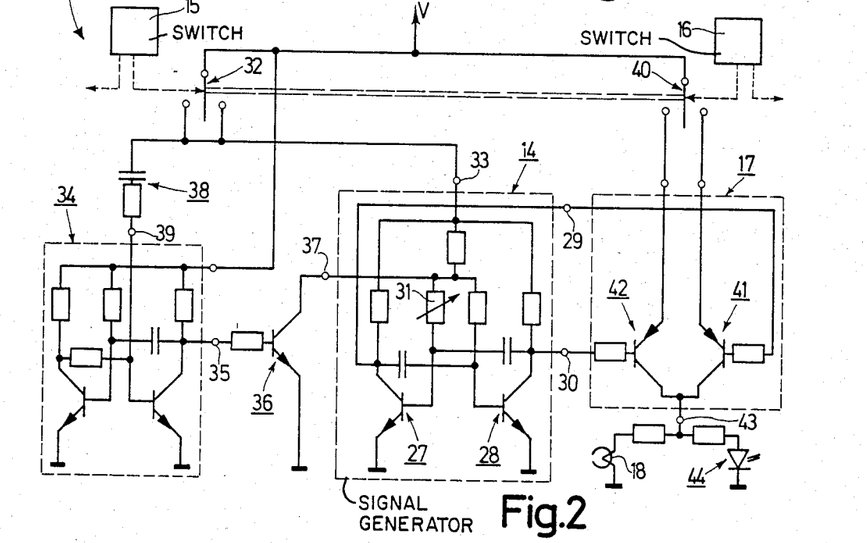
FIG. 2 is a schematic diagram of a recording device whose marking signal generator comprises an astable multivibrator which has a fixed duty factor.

FIG. 2 shows a recording device 12, which is schematically shown in FIG. 1, in more detail. The generator circuit 14 of this recording device simply comprises a astable multivibrator which has a fixed duty factor and which comprises two transistor stages 27 and 28 on whose two outputs 29 and 30 two output-pulse trains of opposite phase are produced as the marking signals M1 and M2, shown in FIGS. 3a and 3b. The two marking-pulse trains have the same period T and consequently the same frequency 1/T, but different duty factors which differ from the value 0.5, the duty factor of one marking-pulse train having the value k and the duty factor of the other marking-pulse train having the value $1-k$.

Figures 3A, 3B:
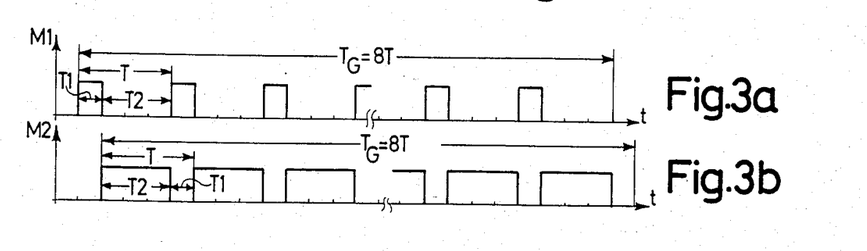
FIGS. 3a and 3b are diagrams of two marking pulse trains having different duty factors.

As used herein the duty factor means the ratio of the pulse width to the pulse spacing that is, to the period. The marking-pulse train M1 has the duty factor T1:T, whose value T1/T is smaller than 0.5 and in the present case is equal to substantially 0.25. The marking-pulse train M2 has the duty factor T2:T, whose value T2/T is greater than 0.5 and in the present case is equal to substantially 0.75, the sum of the pulse width T1 and the pulse width T2 being equal to the period T. The duty factors of the two marking-pulse trains each have a difference of 0.25 relative to the duty factor 0.5 of a symmetrical pulse train. Thus they are situated mirror-symmetrically relative to the duty factor 0.5.

For adjustment purposes the transistor stage 27 of the astable multivibrator 14 has a variable base resistor 31 by means of which the duty factors of approximately 0.25 and 0.75 can be adjusted, these factors remaining fixed during operation of the multivibrator. For application of the supply voltage V to the astable multivibrator 14, a switch 32 can be actuated by either of the buttons 15 and 16 for starting the marking signal recording process. In its rest position shown in FIG. 2 this switch disconnects the power-supply V to the astable multivibrator. In its two operating positions, which it occupies upon actuation of the buttons 15 and 16, switch 32 feeds the supply voltage V to a power-supply connection 33 of the astable multivibrator 14, so that this multivibrator can be started.

As can be seen in FIGS. 3a and 3b, the marking pulse trains M1 and M2 have an overall length $T_G$ which in the present case corresponds to eight times the period T. This means that after each actuation of the button 15 and 16 the astable multivibrator 14 is triggered to start the marking-signal recording process for the time interval $T_G$. In order to achieve this the recording device 12 comprises a monostable multivibrator 34, whose time constant corresponds to the time interval $T_G$ and whose output 35 is connected to an electronic switch 36 formed by a transistor stage, which enables the astable multivibrator 14 via an input 37. Each time that a button 15 or 16 is actuated the monostable multivibrator 34 is triggered via the switch 32, a differentiation network 38 and a control input 39 of this monostable 34, after which the monostable turns off the electronic switch 36 for the time interval $T_G$ via its output 35. Thus, the astable multivibrator 14 is enabled for the time interval $T_G$ and supplies marking-pulse trains M1 and M2 on its outputs 29 and 30 during this time interval.

In order to transfer the marking pulse train M1 or M2, as selected by the user, to a magnetic recording head 18 the recording device 12 comprises a further switch 40, which is coupled to the switch 32 which can be set from a rest position to two operating positions by actuation of the buttons 15 and 16, and which in each operating position turns on a transistor amplifier stage 41 or 42 of the amplifier circuit 17. When the button 15 is actuated the amplifier stage 41 is turned on and consequently the marking-pulse train M1 (shown in FIG. 3a) which appears on the output 29 of the astable multivibrator 14 is amplified and applied from the output 43 of the amplifier circuit 17 to the magnetic recording head 18 in order to be recorded on the record carrier 2. After actuation of the button 16 the amplifier stage 42 is turned on and consequently the marking-pulse train shown in FIG. 3b, which appears on the output 30 of the astable multivibrator 14, is applied to the magnetic recording head 18 via the output 43 of the amplifier circuit 17.

An optical indicator 44 comprising a light-emitting diode is connected to the output 43 of the amplifier circuit 17 in parallel with the magnetic recording head 18. This indicator produces an optical signal which blinks in the rhythm of the pulses applied to the magnetic recording head 18, so that the user of the apparatus has an indication that the marking signals are applied to the magnetic-recording head.

It is to be noted that in practice, for example in the case of use in dictation equipment, values of approximately 25 msecs. and 75 msecs. are found to be favorable for the pulse widths T1 and T2 of the pulses of the two marking pulse trains M1 and M2 respectively supplied by the pulse generator. These values yield a period of T of 100 msec for the two marking-pulse trains, which corresponds to a frequency of 10 Hz and an overall length $T_G$ of 800 msec of the two marking-pulse trains M1 and M2. It follows that in the present case the marking-pulse-train frequency of 10 Hz is situated at a comparatively large frequency spacing from the frequency range of the dictation signals, that is, the speech signals, whose lower limit will generally be about 300 Hz in practice. In this way marking signals and their harmonics have no undesired influence on the dictation signals and the dictation signals have no adverse effect on the detection of the marking signals. However, it is obvious that other values may be selected for the pulse widths T1 and T2, in conformity with the field of application and the required specifications.

As will be apparent from the foregoing, the entire recording device for recording the two marking signals M1 and M2 is of a simple circuit design. In particular, the generation of the two marking signals by means of a single astable multivibrator having a fixed duty factor and comprising a minimal number of components is very simple. By selecting values of 0.25 and 0.75 for the duty factors of the two marking-pulse trains, these pulse trains contain a comparatively small amount of harmonics, which is advantageous in order to minimize the influence of the marking signals on the dictation signals. Moreover, by selecting values of 0.25 and 0.75 for the duty factors the two marking pulse trains can be distinguished from each other in a very reliable manner, which is found to be advantageous for an unambiguous and correct detection of these pulse trains.

Figure 4:
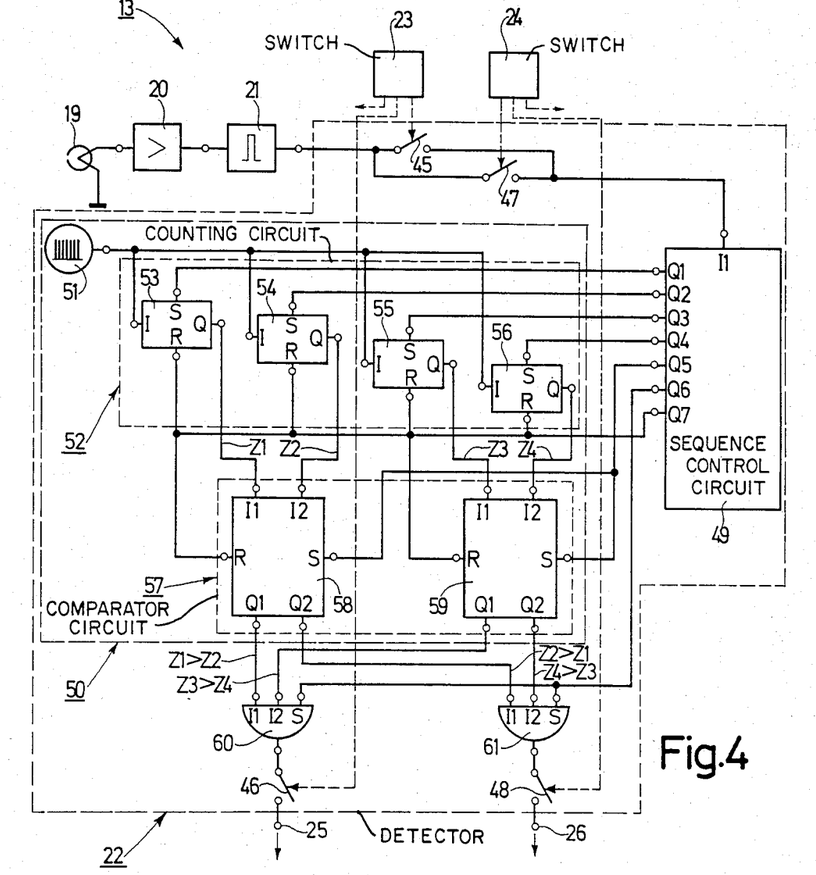
FIG. 4 is a block diagram of a detection device for the two marking signals shown in FIGS. 3a and 3b, whose detector means comprise a digital duty-factor detector.

FIG. 4 shows in more detail the detection device 13 which is shown schematically in FIG. 1. This device comprises a detector circuit 22, to which the marking-pulse trains M1 and M2 to be detected, which have been scanned by the magnetic playback head 19, are applied via the amplifier 20 and the signal-shaper circuit 21, which takes the form of a pulse shaper. For the sake of simplicity the power supply to the individual circuit sections is not shown. The detector circuit 22 comprises a duty-factor detector, to be described hereinafter, which detects the duty factor of a marking-pulse train M1 or M2 applied to it and, depending on the detected duty factor, supplies a specific detection signal. Since the duty factors k and 1−k of the two marking-pulse trains differ from the value 0.5 and are mirror-symmetrical relative to this value, a particularly simple detection of the two duty factors is achieved, because in this case the ratios of the pulse widths to pulse spacings of the two marking pulse trains which ratios correspond to the duty factors, are reciprocal to each other. As a result the duty factors can be detected by a simple comparison of the corresponding time intervals in the duty-factor detector. In this respect it is to be noted that the duty factor k and the ratio v of the pulse width to the pulse spacing of a pulse train are related to each other in accordance with the equation $k = v/v + 1$.

In order to locate a marking signal M1 or M2 which may be recorded several times on the record carrier depending on the number of marked locations on the information-signal track, the user of the apparatus actuates the corresponding button 23 or 24, the drive for the record carrier 2 being switched on by the buttons in a manner not shown, as already stated in the foregoing. In order to simplify the description it is assumed hereinafter that during the search for marking signals the record carrier is driven in the direction of transport indicated by the arrow 3 in FIG. 1 with the same speed as during recording of the marking signals. By actuating the button 23 two switches 45 and 46 can be closed and by actuating the button 24 two switches 47 and 48 can be closed, the switches 45 and 47 being arranged in parallel and both being connected to the output of the signal-shaper circuit 21, the switch 46 being connected to the output 25 and the switch 48 to the output 26 of the detection circuit 22.

By closing one of the two switches 45 and 47 the marking signals scanned from the record carrier can be applied to an input I1 of a sequence-control circuit 49 of the detection circuit 22. The sequence-control circuit controls the time sequence of the cycle of operations of a digital duty-factor detector 50 of the detection circuit 22. The sequence-control circuit 49 may comprise, for example, a clock-pulse generator whose clock pulses are applied to a counting circuit which depending on the applied clock pulses and the marking-pulse trains applied to the sequence-control circuit generates binary control signals which are decoded in a decoder circuit and appear on the outputs Q1 to Q7 of the sequence-control circuit 49 as pulse-shaped analog control signals for the time-control of the duty-factor detector 50. As the generation of such pulse-shaped control signals by means of a sequence-control circuit as briefly described in the foregoing may be regarded as a customary step in digital circuit technology the circuit arrangement of the sequence-control circuit is not shown and described in detail; only the control functions of this circuit are described in more detail hereinafter. It is to be noted that it is alternatively possible to use other sequence-control circuits, for example analog circuits, comprising differentiating stages and integrating stages which function as timing networks, and the like.

The duty-factor detector 50 comprises a scanning-pulse generator 51 for generating a scanning-pulse train whose scanning pulses, as will be explained hereinafter, are used for determining the duration of the pulse width and the pulse spacing of a marking-pulse train by means of a counting process which covers at least one period in order to detect the duty factor of the marking-pulse train.

The frequency of the scanning-pulse train is at least a factor corresponding to the reciprocal of the smaller duty factor greater than the frequency of the marking-pulse trains scanned from the record carrier. In order to ensure a reliable and accurate detection of the duty factor, which is also substantially independent of the speed of transport of the record carrier during detection of the marking signals, it is found to be effective in practice, when the invention is used in dictation equipment, if the frequency of the scanning-pulse train is situated in the range between fifty times and one hundred times the frequency of the marking-pulse trains scanned from the record carrier, because in this way for each period of a marking-pulse train scanned a sufficiently high number of scanning pulses are available for determining the duty factor of this marking-pulse train and this number of scanning pulses is also small enough to allow it to be determined by means of a counting circuit with a minimal counting capacity.

For carrying out this counting process the duty-factor detector 50 comprises a counting circuit 52 which comprises four counting stages 53, 54, 55 and 56 whose inputs I are connected to the scanning-pulse generator 51. The counting stages can be switched on selectively by the set inputs S, which are connected to the outputs Q1, Q2, Q3 and Q4 of the sequence-control circuit 49. The counting stages can be reset by the reset inputs R of the counting stages 53, 54, 55 and 56, which are all connected to the output Q7 of the sequence-control circuit. As will be described in more detail hereinafter, the counting stages of the counting circuit 52 count the number $Z_i$ of scanning pulses occurring during the pulse widths in two periods of a marking pulse train M1 or M2 applied to the sequence-control circuit 49 and the number $Z_p$ of scanning pulses occurring during the pulse spacings in the same two periods.

In order to carry out this comparison the duty-factor detector comprises a comparator circuit 57, which compares the numbers $Z_i$ and $Z_p$, which correspond to the lengths of the pulse widths and the pulse spacings, with each other and thus derives the duty factor of a marking-pulse train. The comparator circuit 57 comprises two comparator stages 58 and 59, which each comprise two inputs I1 and I2, two outputs Q1 and Q2, a set input S and a reset input R.

The input I1 of the comparator stage 58 is connected to the output Q of the counting stage 53 and the input I2 of the comparator stage 58 is connected to the output Q of the counting stage 54. The output Q of the counting stage 55 is connected to the input I1 of the comparator stage 59 and the output Q of the counting stage 56 is connected to the input I2 of the comparator stage 59. The set inputs S of the two comparator stages 58 and 59 are both connected to the output Q5 of the sequence-control circuit 49 and the reset inputs R of the two comparator stages 58 and 59 and the reset inputs R of the counting stages 53, 54, 55 and 56 are connected to the output Q7 of the sequence-control circuit 49. The comparator stages 58 and 59 are constructed so that they effect a comparison to determine which of the two counts applied from the counting stages to its inputs I1 and I2 and corresponding to the length of the pulse widths and the pulse spacings respectively is greater and thus, by comparing these counts which correspond to said lengths of time, detect the duty factor of a marking-pulse train. If the count of the counting stage 53 is greater than that of the counting stage 54 the comparator stage 58 produces a switching signal on its output Q1, as detection signal for a detected duty factor. However, if the count of the counting stage 54 is greater than that of the counting stage 53 the comparator stage 58 produces a switching signal on its output Q2 as the detection signal. In a similar way the comparator stage 59 produces a switching signal on its output Q1 as the detection signal, if the count of the counting stage 55 is greater than that of the counting stage 56 and on its output Q2 if the count of the counting stage 56 is greater than that of the counting stage 55.

The outputs Q1 of the two comparator stages 58 and 59 are connected to the inputs I1 and I2 of an AND-gate 60 and the outputs Q2 of these stages are connected to the inputs I1 and I2 of further AND-gate 61. Each set input S of the two AND-gates 60 and 61 is connected to the output Q6 of the sequence-control circuit 49. The outputs of the AND-gates are connected to the outputs 25 and 26, respectively, of the detector circuit 22 via the aforementioned switches 46 and 48, respectively.

Thus the AND-gates detect whether or not the duty factors of the two successive periods are the same with respect to a duty factor of 0.5.

The operation of the detector circuit 22 will now be described with reference to the time diagram, shown in FIG. 5, for the detection of a marking pulse train M1. In order to locate a marking pulse train M1 the button 23 is actuated so that the drive of the record carrier 2 is switched on and the two switches 45 and 46 are closed. If during the transport of the record carrier a marking signal M1 or M2 is scanned by the magnetic head 19, this signal is transferred to the input I1 of the sequence-control circuit 49 via the closed switch 45, so that this circuit is activated during the first pulse of the marking-pulse train. At the instant of the falling edge of the first pulse of the marking-pulse train the sequence-control circuit 49 switches on the counting stage 53 via its output Q1, so that this stage counts the scanning pulses applied to it by the scanning-pulse generator 51. At the instant corresponding to the rising edge of the second pulse of the marking-pulse train the sequence-control circuit turns off the counting stage 53 via its output Q1 and via its output Q2 if switches on the counting stage 54, so that this stage now counts the scanning pulses applied to it. At the instant corresponding to the falling edge of the second pulse the sequence-control circuit switches off the counting stage 54 via its output Q2 and switches on the counting stage 55 via its output Q3, so that the last-mentioned stage now counts the scanning pulses applied to it. At the instant corresponding to the rising edge of the third pulse the sequence-control circuit switches off the counting stage 55 via its output Q3 and switches on the counting stage 56 via its output Q4, so that this stage now counts the scanning pulses applied to it. At the instant corresponding to the falling edge of the third pulse the sequence-control circuit switches off the counting stage 56 via its output Q4.

Figure 5:
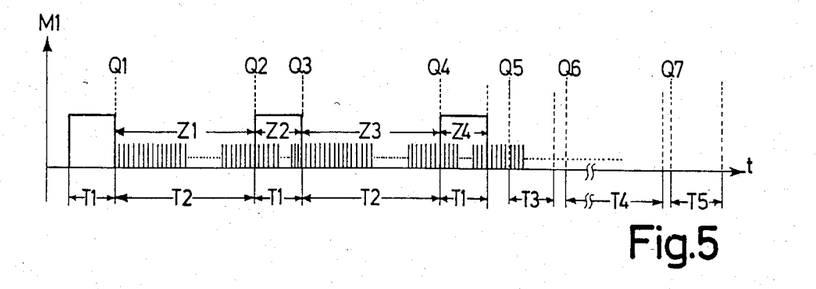
FIG. 5 is a time diagram which illustrates the process of detecting the duty factor of a marking-pulse train as shown in FIG. 3a in the duty-factor detector of the detection device shown in FIG. 4.

In this way the counting stages 53 and 55 have counted the number $Z_p$ of scanning pulses occurring during the pulse spacings in two periods of the marking-pulse train M1, so that the count of the counting stage 53 will be Z1 and that of the counting stage 55 will be Z3, as is indicated in FIGS. 4 and 5. Normally, the two counts Z1 and Z3 will be equal. During these two periods of the marking-pulse train M1 the counting stages 54 and 56 have counted the number $Z_i$ of scanning pulses appearing during the pulse widths in these periods, so that the count of the counting stage 54 will be Z2 and that of the counting stage 56 will be Z4, which counts are normally also equal to each other.

Upon termination of the scanning-pulse counting-process described in the foregoing the sequence-control circuit 49, via its output Q5, switches on the two comparator stages 58 and 59 via the set inputs at a specific instant (see FIG. 5) for a time interval T3, so that these stages compare the counts $Z_i$ and $Z_p$ respectively, i.e. Z2 with Z4, and Z1 with Z3 respectively, thereby determining the duty factor of the marking-pulse train. In the case of a marking pulse train M1 for which, because the duty factor is smaller than 0.5, the count Z1 is greater than the count Z2 and the count Z3 is greater than the count Z4, the two comparator stages 58 and 59 each produce a switching signal on their output Q1 as detection signal. However, in the case of a marking pulse train M2 for which, because the duty factor is greater than 0.5, the count Z2 is greater than the count Z1 and the count Z4 is greater than the count Z3, the two comparator stages 58 and 59 each produce a switching signal on their outputs Q2 as detection signal.

After the counts have been compared in the comparator circuit and the duty factor of marking-pulse train has thus been determined, the sequence control circuit 49, via its output Q6, enables the two AND-gates 60 and 61 via their set inputs S at a specific instant (see FIG. 5). These gates supply an output signal when a detection signal appears on the two other inputs I1 and I2. If a marking-pulse train M1 appears the AND-gate 60 supplies an output signal and if a marking-pulse train M2 appears the AND-gate 61 supplies an output signal. When the button 23 is actuated for locating a marking-pulse train M1, only an output signal supplied by the AND-gate 60 will be transferred to the output 25 of the detector circuit 22 via the switch 46 for further processing in the apparatus. In a similar way, when the button 24 is actuated for searching a marking-pulse train M2, only an output signal supplied by the AND-gate 61 will be transferred to the output 26 of the detector circuit 22 via the switch 48.

As can be seen in FIG. 5, the sequence-control circuit 49, via its output Q6, keeps the two AND-gates 60 and 61 switched on via their set inputs S for a specific time interval T4, which time interval has been selected so that the detection signal produced on the outputs 25 and 26 respectively is applied to the detection circuit 22 for a sufficiently long time to allow further processing in the apparatus. After this time interval T4 has elapsed the sequence-control circuit supplies a reset signal on its output Q7 for a given time interval T5, which signal is applied to the reset inputs R of the counting stages 53, 54, 55 and 56 and the comparator stages 58 and 59 in order to reset these stages after detection of a marking-pulse train, so that subsequently a following detection cycle can be carried out.

If a detection signal from a comparator stage 58 or 59 is applied to the set inputs S and to only one of two other inputs I1 and I2 of the two AND-gates 60 and 61; it is obvious that the AND-gates will not supply an output signal. This means that each marking-pulse train must be available in undisturbed form for at least two periods in order to be identified as a marking signal, and that in other cases no detection of these pulses is effected. In this way non-recurrent spurious pulses scanned from the record carrier are suppressed, so that they cannot give rise to an output detection signal of the detector circuit. It is obvious that the reliability of the marking-pulse train detection may be further increased if the detection covers more than two periods of the marking-pulse trains. For each further period two further counting stages are required in the counting circuit and a further comparator stage in the comparator circuit; moreover, the two AND-gates in addition to their set inputs S, should comprise a number of inputs corresponding to the number of periods during which the duty-factor detector is operative. Time-sequence control of the additional circuit sections is then effected by a sequence-control circuit which has been extended accordingly. It is evident that a higher detection reliability also leads to more extensive circuitry. However, in practice it has been found that a detection which covers two periods is sufficiently reliable.

If during detection of the marking-pulse trains in the fast wind mode the record carrier is driven with a speed which is a factor N higher than the speed during recording, which is preferred in view of a rapid search marked passages, the aforementioned detection method will remain the same, because the duty factor, or the corresponding ratio of the lengths of the pulse widths and the pulse spacings, of the marking-pulse trains scanned from the record carrier is independent of the speed of transport of record carrier during scanning. In the case of an N-fold speed of transport of the record carrier, the period of the scanned marking-pulse trains has the value T/N and consequently the values for the pulse widths and pulse spacings are T1/N and T2/N. As a result of this, the counts of the counting stages 53, 54, 55 and 56 of the dutyfactor detector 50 are then Z1/N, Z2/N, Z3/N and Z4/N. However, during the consecutive comparison in the comparator circuit 57 for determining the duty factor, these counts yield the same comparison result as the counts Z1, Z2, Z3 and Z4 which are proportional thereto, which is necessarily so because the duty factor remains unchanged. Thus, a correct detection of the marking pulse trains by means of the same detection circuit is then also guaranteed without additional steps. This is also valid if the marking signals are recorded at different speeds of transport of the record carrier, because the duty factor of the marking-pulse trains then also remains unchanged. It is to be noted that the detection method described in the foregoing may also be applied without any modifications if the speed of transport of the record carrier changes during the search for marking signals, which is the case if the record carrier is not driven by means of a capstan with a constant speed of revolution, but via a take-up reel driven with a constant number of revolutions per second, the speed of transport increasing continually as the spool diameter increases. The duty factor of the marking-pulse trains then also remains the same and only the absolute values of the counts of the counting stages 53, 54, 55 and 56 will change, but the ratio of the counts of the counting stages determined by the comparator circuit for determining the duty factor will not change. Finally, it is to be noted that the detection method described in the foregoing also remains the same if in order to locate passages which are identified by marking-pulse trains, the record carrier is driven in a direction opposite to that during recording of the marking-pulse trains.

Suitably, the generation and the detection of the marking-pulse trains M1 and M2 is carried out in a simple manner by means of a micro-computer, when then obviously also performs the other control and monitoring functions in a recording and/or reproducing apparatus equipped with such a micro-computer. For example, the micro-computer which is commercially available from National Semiconductor under the type designation COP 441 may be used.

Figures 6, 7, 8:
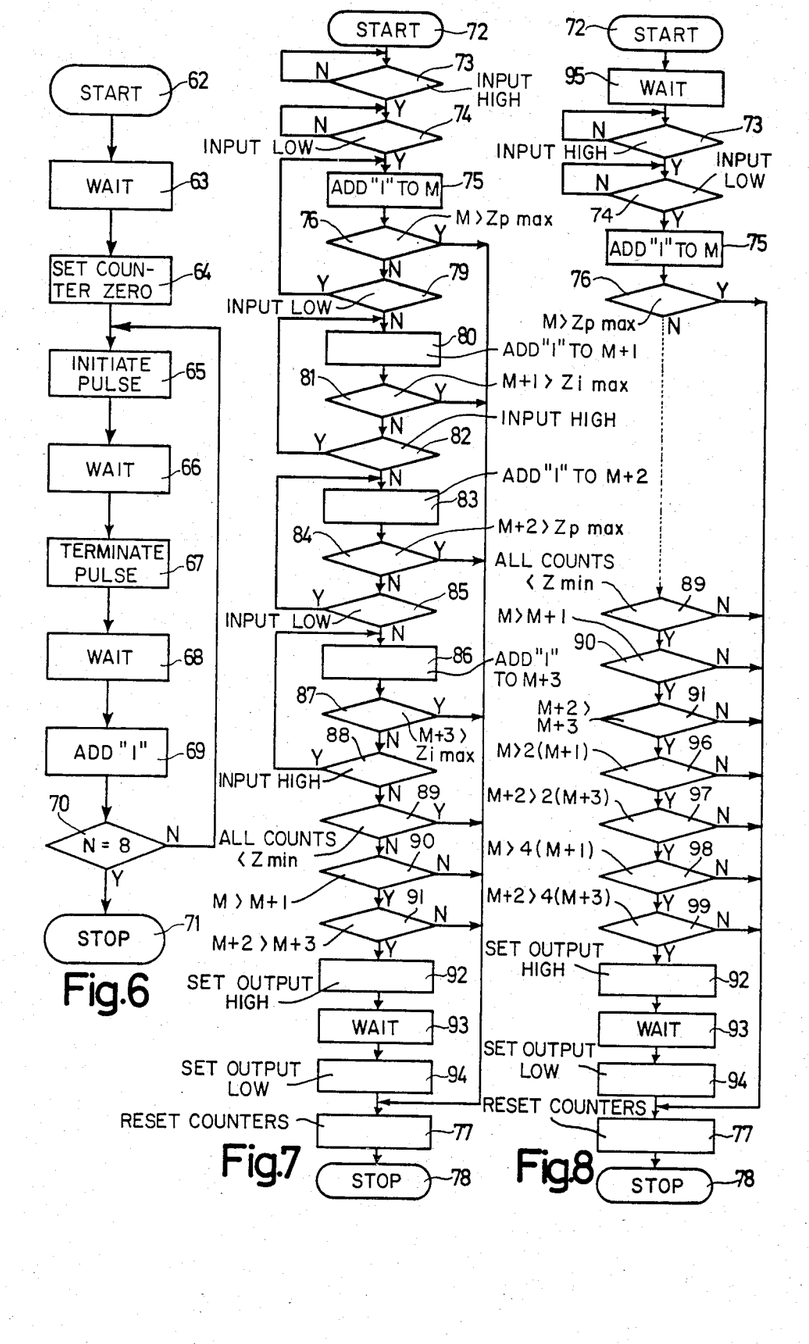

FIG. 6 is a flow-chart of a program for the generation of a marking pulse M1 as shown in FIG. 3a. This program starts in the block 62, and is initiated by actuating a button for switching on the generation of a marking-pulse train M1. In block 63 a waiting time $T_p$ after the program start is observed before the program is continued. Thus, during the time interval $T_p$ no marking pulse train M1 is generated. This prevents a continuously repeated program start, which is possible by constantly actuating the button, and thereby prevents generation and recording of an uninterrupted series of marking pulse trains on the record carrier. The individual marking pulse trains M1 recorded on the record carrier are consequently spaced by a time interval corresponding to at least the time interval $T_p$. When the waiting time $T_p$ has elapsed a counter N is set to the value 0 in block 64. In the next program step in block 65 a pulse output of the microcomputer, on which output the marking pulse train M1 appears, is pulled high. Subsequently, in block 66 a waiting time $T_1$ is observed before the program is continued. This means that the pulse output will remain high for the time interval T1, so that the first pulse of the marking-pulse train with a duration T1 is generated. After the waiting time T1 has elapsed this pulse output is pulled to a low level in block 67. Then in block 68, a waiting time T2 is observed before the program is continued. Consequently, the pulse output remains low for the time interval T2, so that a first pulse spacing of the marking pulse train having a duration T2 is generated. When the waiting time T2 has elapsed the count of the counter N is incremented by 1 in block 69. In block 70 it is ascertained when the count of the counter N corresponds to the value 8. As long as this is not the case the program cycle is repeated from block 65, so that the further pulses and pulse spacings of the marking pulse train M1 are generated. After all pulses and pulse spacings of the marking pulse train M1 have been generated, the count of the counter N will be 8, after which in block 71 this program cycle is terminated and the microcomputer may proceed with another program cycle.

It is evident that a marking-pulse train M2 can be generated in exactly the same way, in which case only the waiting times T1 and T2 in the relevant program cycle are interchanged. Thus, two separate pulse-generators for the generation of the two marking-pulse trains M1 and M2 are formed in a single manner by means of the micro-computer.

FIG. 7 shows a flow chart for a program for the detection of a marking-pulse train M1, as shown in FIG. 3. It is to be noted that the detection method in accordance with this program cycle in principle corresponds to that as described for the detection circuit shown in FIG. 4, in which a marking-pulse train is scanned by means of a scanning-pulse train. In block 72 this program cycle is started, by actuating a button for switching on the search and detection process of such a marking-pulse train. Once the program has been started, it is ascertained in block 73 whether a pulse input of the microcomputer, to which input the marking pulse trains scanned from the record carrier can be applied in order to detect them, is at a high level. As long as this is not the case this check is repeated in block 73. However, if a high level is detected, the next program step in block 74 is started. Thus, the arrival of the first pulse of a marking-pulse train is ascertained in block 73. In block 74 it is ascertained whether the pulse input is at a low level. If this is not the case this check is repeated; if the level is low, however, the next program step is started in block 75. Thus, in block 74 the falling edge of the first pulse of a marking-pulse train is detected. In this respect it is to be noted that the two program steps in the blocks 73 and 74 may be dispensed with if the micro-computer comprises a pulse input by which the first falling edge of a pulse train is detected by means of the hardware as is the case in the aforementioned microcomputer National Semiconductors type COP 441.

After the appearance of the falling edge of the first pulse the count of a counter M is incremented by 1 in block 75. Subsequently, it is ascertained in block 76 whether the count of counter M is greater than a permissible maximum value $(Z_p)_{max}$. If this is the case, which, as will be explained hereinafter, corresponds to a fault condition, the program proceeds to the program step in block 77.

In block 77 the counter M and three further counters M+1, M+2 and M+3 are set to 0, so that they are ready for a new detection process. In the next program step in block 78 the program cycle is terminated, after which for example a new program cycle for detecting a marking-pulse train M1 may commence; it is alternatively possible to proceed with another program cycle.

If the check in block 76 indicates that the count of counter M is smaller than the maximum value $(Z_p)_{max}$, it is ascertained in the next program step in block 79 whether the set pulse input is still low. If this is so, the program cycle is repeated cyclically after block 75, but if this is not the case the program proceeds with the next block 80. In this way the count of the counter M is continually incremented, starting from 0, in accordance with the operating frequency of the microcomputer, as long as the pulse input is low, which corresponds to the first pulse spacing of a marking-pulse train, so that in fact the scanning pulses occurring within this pulse spacing are counted.

If a correct marking-pulse train is present the length of the pulse spacing should not exceed specific maximum value. The permissible maximum value $(Z_p)_{max}$ for the count of the counter M has been selected in conformity with this maximum length. Thus, it is ascertained in block 76 whether a pulse spacing occurs which is longer than permissible. If this is so, the program is not continued but, as only a spurious signal has been scanned from the record carrier, the program proceeds to block 77, in which the counter M is again set to the value 0, so that it is ready for a new counting process when a correct marking-pulse train appears, and subsequently the program is terminated in block 78.

If after the appearance of the rising edge of the second pulse of a marking-pulse train M1 the check in block 79 indicates that the pulse input is no longer low, the count of the counter M+1 is incremented by 1 in block 80. Subsequently, it is ascertained in block 81 whether the count of the counter M+1 is greater than the value $(Z_i)_{max}$. If this is the case, which again corresponds to a fault condition, the program cycle is continued in block 77. However, if this is not the case, it is ascertained in block 82 whether after the appearance of the rising edge of the second marking-pulse train the pulse input is again at a high level. Thus, the count of the counter M+1 is incremented continually in accordance with the operating frequency of the microcomputer, as long as the pulse input is at a high level, which corresponds to the pulse width of the second pulse of a marking-pulse train, so that in fact the scanning pulses occurring within this pulse width are counted.

In the case of a correct marking-pulse train the pulse width should not exceed a specific maximum length. The maximum permissible value $(Z_i)_{max}$ for the count of the counter M+1 has been selected in conformity with this maximum length. Thus, in block 81 it is ascertained whether a pulse which is longer than permissible appears and, if such a long pulse is detected, the program cycle proceeds with block 77 because a disturbed or a spurious signal appears.

If after the arrival of the falling edge of the second pulse of the marking-pulse train the check in block 82 shows that the pulse input is no longer high, the count of the counter M+2 is incremented by 1 in block 83. Subsequently, in block 84, it is ascertained in the same way as in block 76 whether the count of the counter M+2 is greater than the maximum value $(Z_p)_{max}$. If this is the case, which corresponds to a fault condition, the program sequence is continued to block 77. If this is not the case, it is ascertained in block 85 whether the pulse input is still low after the appearance of the falling edge of the second pulse of the marking-pulse train. Should this be the case, the program is repeated cyclically starting in block 83. In this way the counter M+2 is incremented continually for the duration of the second pulse spacing of marking pulse train in the operating rhythm of the microcomputer, which corresponds to counting of the scanning pulses occurring within this pulse spacing.

When after the appearance of the rising edge of the third pulse of a marking-pulse train it is ascertained in block 85 that the pulse input is no longer low, the count of the counter M+3 is incremented by 1 in block 86. Subsequently, in block 87, it is ascertained in the same way as in block 81 whether the count of the counter M+3 is greater than the maximum value $(Z_i)_{max}$. If this is so, which corresponds to a fault condition, the program sequence proceeds with block 77. If this is not the case, it is ascertained in block 88 whether the pulse input is still high after the arrival of the rising edge of the third pulse of a marking pulse train. If this is so, the program sequence is cyclically repeated starting in block 86. In this way the count of the counter M+3 is incremented continually during the third pulse of a marking-pulse train in the operating rhythm of the microcomputer, which corresponds to counting of the scanning pulses occurring during this pulse. This counting process is terminated if after the arrival of the falling edge of the third pulse of a marking-pulse train the check-in block 88 indicates that the pulse input of the microcomputer is no longer high.

Upon termination of this part of the program the counter M, M+1, M+2 and M+3 each have a specific count, the counts of the counters M and M+2 having values which correspond to the lengths of the pulse spacings of two periods of a marking-pulse train and the counts of the counter M+1 and M+3 having values which correspond to the lengths of the pulse width of these two periods of a marking-pulse train. In the next part of the program the actual detection of the duty factor of a marking-pulse train M1 is carried out.

Firstly, it is ascertained in block 89 whether the counts of the counters M, M+1, M+2 and M+3 are smaller than the value $Z_{min}$. In this way it is checked whether the pulse widths and pulse spacings each have a specific minimum value. Should this not be the case, for example if brief spurious pulses occur, the program sequence continues in block 77 to allow for this fault condition, the four counters being set to the value 0 for a new detection process. However, if a correct marking-pulse train appears, the counts of the four counters being greater than $Z_{min}$, it is ascertained in block 90, for detecting the duty factor of the marking-pulse train, whether the count of the counter M, which count corresponds to the length of the first pulse spacing, is greater than the count of the counter M+1, which count corresponds to the width of the second pulse, as will be the case for a marking pulse train M1 as shown in FIG. 3a. Should this not be the case, the program sequence continues in block 77 because a fault condition occurs. However, if the count of the counter M is greater than the count of the counter M+1, it is ascertained for again detecting the duty factor of said marking-pulse train in block 91, in the same way as in block 90, whether the count of the counter M+2, which corresponds to the length of the second pulse spacing, is greater than the count of the counter M+3, which corresponds to the width of the third pulse, as in the case of a marking-pulse train M1. If not, the program sequence continues in block 77, because of the occurrence of a fault condition. If it is greater, it may be assumed, with a high reliability, that in conformity with the duty detected in blocks 90 and 91 a marking pulse train M1 occurs.

Then, in block 92 a pulse output of the micro-computer, which output serves for supplying a detection signal upon the occurrence of a marking-pulse train M1, is set to a high level. Subsequently, in block 93 a waiting time $T_D$ is observed before the program sequence is continued. When the waiting time $T_D$ has elapsed the pulse output is set to a low level in block 94. Thus, the micro-computer supplies a pulse-shaped detection signal the pulse output for the time interval $T_D$, which signal is available for control purposes for further processing in the apparatus. It is obvious that the time interval $T_D$ is selected so that the detection signal appearing on the pulse output is available for a sufficiently long time.

After the detection signal has appeared at the pulse output of the micro-computer, after a marking signal M1 has been detected and processed for control purposes in the apparatus, the four counters M, M+1, M+2 and M+3 are set to the value 0 in block 77, so that these counters are available for a new detection process. Subsequently, the program is terminated in block 78.

It is evident that the detection of a marking-pulse train M2 can be effected in a manner which is exactly identical to the detection of a marking-pulse train M1 by means of the program described in the foregoing, the comparison of the values to be carried out during the program being effected in an opposite sense. In this way two separate duty-factor detectors for detecting the duty factors of the two marking-pulse trains M1 and M2 are obtained in simple manner by means of the microcomputer.

The program sequence shown in FIG. 8, which is a more extensive variant to the program sequence shown in FIG. 7, comprises the following additional program steps. After the program has been started in block 72, a waiting time $T_B$ is observed in block 95 before the program sequence is continued. The waiting time $T_B$ then corresponds to the overall length of the marking-pulse trains scanned from the record carrier. If at the beginning of a detection process of a marking-pulse train the scanning element for scanning that pulse train is situated opposite the part of the record carrier containing a marking-pulse train which has already been detected during a preceding detection process and which has resulted in the record carrier transport being stopped, a repeated detection and processing of the pulse train are precluded despite the fact that this previously detected marking-pulse train is scanned again. The waiting time $T_D$ then ensures that a double or multiple detection of a marking pulse train is not possible. After the waiting time $T_B$ has elapsed the program sequence is continued in block 73, in the same way as the program sequence shown in FIG. 7. Until block 91 the program sequence of FIG. 8 corresponds to that of the FIG. 7.

In block 91 it is ascertained whether the count of the counter M+2 is greater than the count of the counter M+3. If this is the case, further comparisons are made in the program of FIG. 8 in order to ensure that, in addition the permissible duty factors of the marking-pulse trains M1 scanned from the record carrier are limited to a specific range. In the present case it is assumed that for a nominal value of the duty factor of ¼, as is the case with the marking-pulse train M1 shown in FIG. 3a, the range of permissible duty factors extends from a duty factor of ⅓ to a duty factor of 1/5. In this respect it is to be noted that in practice the marking-pulse trains M1 and M2 scanned from the record carrier do not have exactly one specific duty factor, but that because of tolerances, wow-and-flutter acceleration effects in the record-carrier transport, and the like, a range of duty factors will occur. In order to ascertain whether the marking-pulse trains scanned from the record carrier has a duty factor within this range of duty-factors, the following program is utilized.

In this respect it is to be noted that from the easy to derive equation $v = k/1 - k$, in which k is the duty factor and v the ratio between the lengths of the pulse widths and pulse spacings of a pulse train, it follows that the duty factor of ⅓ corresponds to a ratio between the lengths of the pulse widths and the pulse spacings of ½ and that the duty factor of 1/5 corresponds to a ratio between the lengths of the pulse widths and pulse spacings of ¼.

In block 96 it is ascertained whether the count of the counter M is greater than twice the count of the counter M+1, which can be effected very simply. If this is not the case, which corresponds to a fault condition, the program is continued in block 77. However, if it is greater, which happens when the ratio between the lengths of the pulse widths and the pulse spacings of the marking-pulse train scanned from the record carrier is smaller than the value ½ and consequently the duty factor is smaller than ⅓, this check is repeated for the count of the counters M+2 and M+3 in block 97, in the same way as in block 96. If the check in block 97 also yields a duty factor smaller than ⅓ it is ascertained in block 98 whether the ratio between the lengths of the pulse widths and pulse spacings of the marking pulse train scanned from the record carrier is greater than the value ¼, which corresponds to a duty factor of 1/5. For this purpose it is checked in block 98 whether the count of the counter M is smaller than four times the count of the counter M+1, which can also be effected in a very simple manner. If this is not smaller, the program is continued in block 77. If it is smaller, which happens when the duty factor has a value greater than 1/5, this check is repeated for the counts of the counters M+2 and M+3 in block 99 in the same way as in block 98. If this check also has a positive result, the program is continued in block 92 in the same way as in the program of FIG. 7.

As is apparent from the foregoing description of the flow charts for the detection of the duty factors of marking pulse trains M1, a multiplicity of checks can be carried out simply and without an extensive circuitry by means of the microcomputer, yielding a very high detection accuracy and immunity to faults. It is obvious that again the counting process may cover more than two periods of a marking pulse train. The range limits for the duty factor described hereinbefore are very suitable because for checking these limits the relevant counts need only be multiplied by this factor 2 or 4, which can be effected in a very simple manner. Of course, the range limits may be selected differently in conformity with the obtaining specifications.

In the embodiments of the invention described in the foregoing both the recording device for recording the marking signals and the detection device for detecting the marking signals are incorporated in a single apparatus. It is obvious that a system in accordance with the invention for recording and/or detecting two marking signals may comprise a recording device for recording the marking signals in one apparatus, for example a portable battery-operated pocket dictation machine, and a detection device in another apparatus, for example a mains-operated dictation machine. Moreover, the system in accordance with the invention may also be used in apparatus for recording and/or reproducing music signals, the marking signals being used for identifying the beginning or end of separate passages or music. It is evident that the system in accordance with the invention is not limited to the use in conjunction with a magnetizable record carrier in the form of a tape. Alternatively, there may be provided record carriers in the form of sheets, belts or discs which can be scanned by optical or capacitive means. The information signals and the marking signals may be stored in a common track on a record carrier without interaction of the signals because of their frequency spacing, so that the two signals may be recorded or reproduced by means of the same scanning element. In the embodiments described a counting process for the detection or marking pulse trains is started on the falling edge of the first pulse; it is obvious that this may also be effected on a rising edge of a pulse.

What is claimed is:

1. A system for recording and/or detecting marking signals of two different types, recorded on or scanned from a record carrier, which signal differ from each other in respect of at least one parameter, comprising:
   a recording device for selectively recording marking signals, comprising generator means for generating the marking signals to be recorded on a record carrier, and
   a detection device for detecting said marking signals, comprising detector means for detecting the marking signals read from the record carrier,
   characterized in that the generator means comprises a single pulse generator only for supplying marking signals in the form of two marking-pulse trains having a same frequency to which a given period corresponds, but having different duty factors which differ from the value 0.5, the duty factor of one marking-pulse train being k and the duty factor of the other marking-pulse train being 1−k; means for enabling said generator for a period of time equal to a given plurality of said given periods only; and means for selecting one of said marking-pulse trains and for recording said selected train on the record carrier for said period of time, and
   the detector means comprises a single duty-factor detector only, which detects the duty factor of a marking-pulse train with respect to a value of 0.5, during at least two consecutive periods, and in response to detection that said at least two consecutive periods have the same duty factor supplies a specific detection signal depending on the detected duty factor.

2. A system as claimed in claim 1, characterized in that the duty factors k and 1−k of the two marking-pulse trains are approximately 0.25 and 0.75 respectively.

3. A system as claimed in claim 2, characterized in that the pulse generator comprises a single astable multivibrator having a fixed duty factor and the marking-pulse trains are formed by the two output-pulse trains of opposite phase supplied by the astable multivibrator.

4. A system as claimed in claim 3, characterized in that the duty-factor detector comprises a scanning-pulse generator, for generating a scanning-pulse train whose frequency is at least a factor corresponding to the reciprocal of the smaller duty factor higher than the frequency of the marking-pulse train scanned from the record carrier, a counting circuit which counts the number $Z_i$ of scanning pulses occurring during the pulse width in at least one period of a marking-pulse train and the number $Z_p$ of scanning pulses occurring during the pulse spacing in said period, and a comparator circuit, which compares the numbers $Z_i$ and $Z_p$ with each other and thereby determines the duty factor of a marking-pulse train.

5. A system as claimed in claim 1, characterized in that the pulse generator comprises a single astable multivibrator having a fixed duty factor and the marking-pulse trains are formed by the two output-pulse trains of opposite phase supplied by the astable multivibrator.

6. A system as claimed in claim 5, characterized in that the duty-factor detector comprises a scanning-pulse generator, for generating a scanning-pulse train whose frequency is at least a factor corresponding to the reciprocal of the smaller duty factor higher than the frequency of the marking-pulse train scanned from the record carrier, a counting circuit which counts the number $Z_i$ of scanning pulses occurring during the pulse width in at least one period of a marking-pulse train and the number $Z_p$ of scanning pulses occurring during the pulse spacing in said period, and a comparator circuit, which compares the numbers $Z_i$ and $Z_p$ with each other and thereby determines the duty factor of a marking-pulse train.

7. A system as claimed in claim 1, characterized in that the duty-factor detector comprises a scanning-pulse generator, for generating a scanning-pulse train whose frequency is at least a factor corresponding to the reciprocal of the smaller duty factor higher than the frequency of the marking-pulse train scanned from the record carrier, a counting circuit which counts the number $Z_i$ of scanning pulses occurring during the pulse width in at least one period of a marking-pulse train and the number $Z_p$ of scanning pulses occurring during the pulse spacing in said period, and a comparator circuit, which compares the numbers $Z_i$ and $Z_p$ with each other and thereby determines the duty factor of a marking-pulse train.

8. A system as claimed in claim 1, characterized in that said period of time equals eight said given periods.

9. A system for recording and/or detecting marking signals of two different types, recorded on or scanned from a record carrier, which signals differ from each other in respect of at least one parameter, comprising:
a recording device for selectively recording marking signals, comprising generator means for generating the marking signals to be recorded on a record carrier, and
a detection device for detecting said marking signals, comprising detector means for detecting the marking signals read from the record carrier,
characterized in that the generator means comprises a single pulse generator only for supplying marking signals in the form of two marking-pulse trains having a same frequency to which a given period corresponds, but having different duty factors which differ from the value 0.5, the duty factor of one marking-pulse train being k and the duty factor of the other marking-pulse train being $1-k$; means for enabling said generator for a period of time equal to a given plurality of said given periods only; and means for selecting one of said marking pulse trains and for recording said selected train on the record carrier for said period of time,
the detector means comprises a single duty factor detector only, which detects the duty factor of a marking-pulse train with respect to a value of 0.5, during at least two consecutive periods, and in response to detection that said at least two consecutive periods have the same duty factor supplies a specific detection signal depending on the detected duty factor, and
said duty-factor detector comprises a scanning-pulse generator, for generating a scanning-pulse train whose frequency is at least a factor corresponding to the reciprocal of the smaller duty factor higher than the frequency of the marking-pulse train scanned from the record carrier, two counting stages which count the number $Z_i$ of scanning pulses occurring during the pulse width in respective successive periods of a marking-pulse train and two counting stages which count the number $Z_p$ of scanning pulses occurring during the pulse spacing in said successive periods, and two comparator stages, which each compare the numbers $Z_i$ and $Z_p$ with each other for a respective one of said periods and thereby determine the respective duty factors of said periods of a marking-pulse train.

* * * * *